United States Patent [19]

Robertson, Jr.

[11] 4,448,645

[45] May 15, 1984

[54] ELECTRODING OF MULTI-LAYERED EPITAXIAL STRUCTURES

[75] Inventor: Glenn D. Robertson, Jr., Malibu, Calif.

[73] Assignee: The United States of America as represented by the Secretary of the Air Force, Washington, D.C.

[21] Appl. No.: 512,847

[22] Filed: Jul. 11, 1983

[51] Int. Cl.³ .................................................. C25D 5/02
[52] U.S. Cl. ...................................................... 204/15
[58] Field of Search ........................ 204/15, 38 R, 38 E

[56] References Cited

U.S. PATENT DOCUMENTS 3,400,210  9/1968  Reimer ................................... 204/15
3,560,351  2/1971  Abbott ................................... 204/15
4,088,546  5/1978  Wu ......................................... 204/15

Primary Examiner—T. M. Tufariello
Attorney, Agent, or Firm—Donald J. Singer; Bernard E. Franz

[57] ABSTRACT

To locate the very thin transparent low-resistivity planar electrode layers in a multilayer epitaxial structure for an electrooptic tunable filter, one edge of the stack is covered with a dielectric, and a long diagonal strip opening is made through the dielectric. A common metal electrode is formed on the opposite edge of the stack. The edge with the strip opening is immersed in a plating solution and potential applied at the common electrode so that a metal deposit is formed at the exposed location of each low-resistivity layer along the strip opening.

3 Claims, 7 Drawing Figures

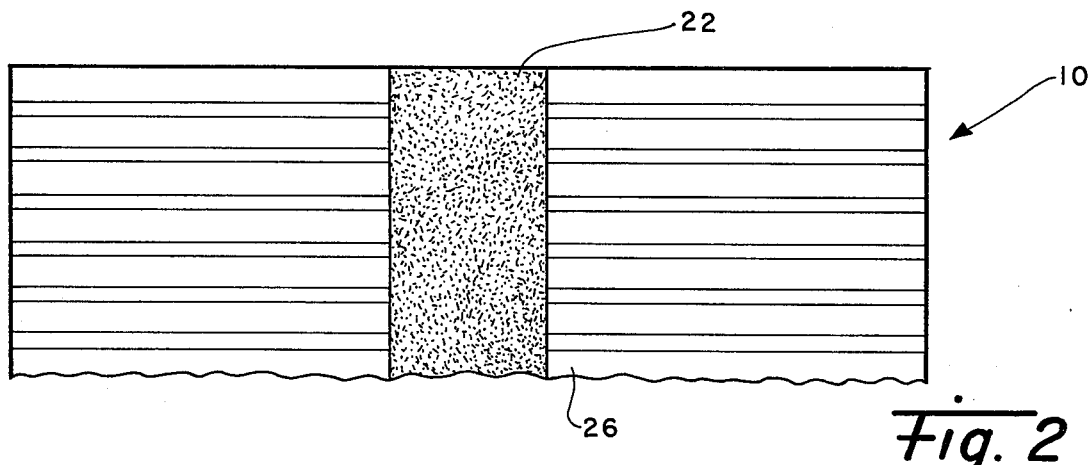
Fig. 2
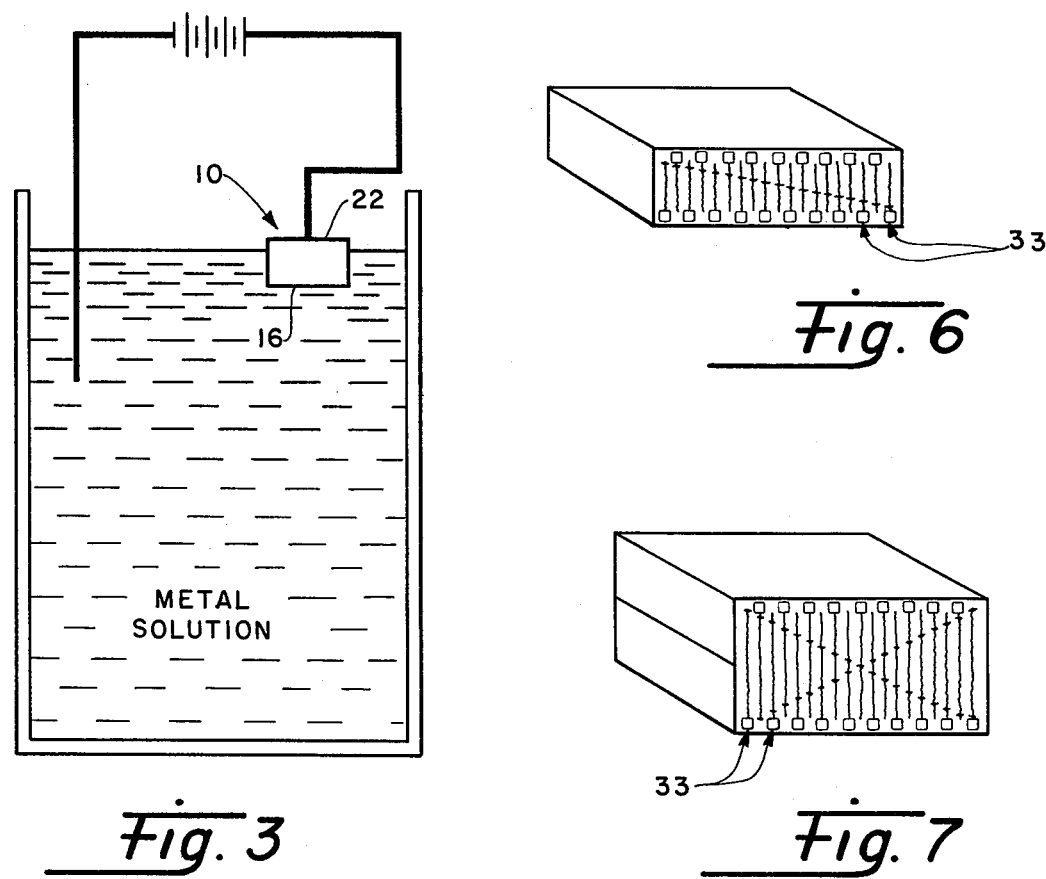
Fig. 3
Fig. 6
Fig. 7

ELECTRODING OF MULTI-LAYERED EPITAXIAL STRUCTURES

RIGHTS OF THE GOVERNMENT

The invention described herein may be manufactured and used by or for the Government of the United States for all governmental purposes without the payment of any royalty.

BACKGROUND OF THE INVENTION

This invention relates to a method of forming electrodes on multi-layered epitaxial structures, and more particularly to forming electrodes on an electro-optic tunable filter.

Optical bandpass filters whose transmission characteristics may be controlled by the application of DC voltages are useful in a variety of different applications, such as infrared focal plane technology, optical signal processing, high resolution spectroscopy, solar physics, astrophysics, and high pressure tunable lasers.

Some examples of the electro-optic devices are disclosed in U.S. Pat. Nos. 3,164,665 to Stello; 3,740,512 to Siegel; 3,741,626 to Wentz; 4,240,696 to Tracy et al; and 4,269,481 to Yeh et al.

One proposed and highly attractive configuration for an electro-optic tunable filter consists of a stack of epitaxially grown layers of alternating high and low resistivity. The low-$\rho$ layers, which must be transparent and are thus very difficult to distinguish from the high resistivity layers, act as field controlling electrodes. They must be individually and independently provided with a reliable electrical contact. Because these layers are quite thin (one micron or less), and are only separated from each other by about 20-25 microns of high resistivity material, contact to any one layer by conventional means involving an opening (generated by a preexisting mask set) in an insulating layer is subject to serious alignment difficulties. The thin layers are difficult to see in cross-section and their actual location is determined by manufacturing tolerances in the liquid phase epitaxial (LEP) growth process. Any hole pattern generated by a mask would be required to use very small holes (approximately 10 microns in diameter, or less) in order not to run the risk of contacting the wrong layer because of layer thickness tolerance runout over a stack of, say, 50 layers. The possibility of missing a contact also exists for the same reason for a set of holes generated from a preexisting pattern.

To the best of my knowledge, prior to this invention no suitable means for locating and contacting these layers has been proposed which would allow for cumlative tolerance variations caused by slight fluctuations in layer thickness or position. Tracy et al and Yeh et al for example discuss extremely thin layers, but are silent as to formation of the electric contact. Some actual experimental filters may have used relatively thick layers, which would facilitate locating the electrodes.

SUMMARY OF THE INVENTION

An object of the invention is to provide a sure way of locating the very thin (<1 $\mu$ thick) transparent planar electrode in a multilayer electro-optic tunable filter and making a high reliability contact to it.

According to the invention, a long diagonal strip-type opening in a dielectric coating is used for locating and contacting the low resistivity layers in a multilayer epitaxial structure. The invention utilizes very thin low-resistivity layers to provide a self-aligned decorating or locating mark which can be used either as the contact pad or as an in-situ element in a subsequent mask for the deposition of some other electrode material.

BRIEF DESCRIPTION OF THE DRAWING

FIG. 2 is a view showing a metallic cathode area formed on another edge of the stack;

FIG. 3 is a diagram showing the plating process to form contact areas along the stripe;

FIGS. 6 and 7 are perspective views which suggest possible electrode configurations.

DETAILED DESCRIPTION

Figure 1:
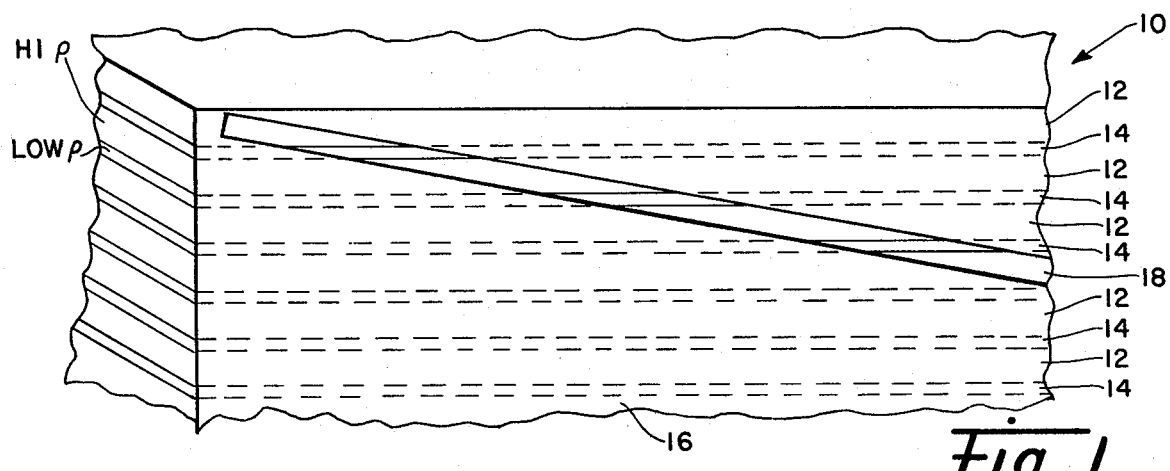
FIG. 1 is a perspective view showing one corner of a stack of high-resistivity layers separated by thin low-resistivity layers, with a diagonal stripe formed through a dielectric coating on one edge of the stack.

Referring to FIG. 1, one corner of a stack 10 of epitaxially grown layer is illustrated in perspective. Such a stack may be used to produce an electro-optic tunable filter. The stack 10 comprises alternating high resistivity layers 12 and low resistivity layers 14. The thickness of the layers 14 is greatly exaggerated in the drawing, relative to the thickness of the layers 12. The low-resistivity layers 14, which must be transparent and thus very difficult to distinguish from the high resistivity layers, act as field controlling electrodes. Alternate low-resistivity layers may be control electrodes and the others may be ground electrodes. Each low-resistivity layer must be individually and independently provided with a reliable electrical contact. The low-resistivity layers 14 may have a thickness of one micron or less and be separated by only about 20-25 microns of high-resistivity material 12. Making electrical contact by conventional means as noted under "Background" is subject to serious alignment difficulties.

To avoid this difficulty, a new approach according to the invention utilizes a long strip-type opening in a dielectric (electrically insulating) layer which does not require a preexisting hole pattern nor any precise alignment with the thin low-resistivity layers. FIG. 1 shows a partial view of the edge 16 of the stack 10 chosen to carry the electrodes with a stripe opening 18 in a dielectric coating. The coating and stripe opening may be formed by any suitable conventional means. For example, the dielectric coating may be a photoresist with exposure, development, and etching to form the strip 18. Since FIG. 1 shows the edge or side 16 of the stack with the dielectric layer and stripe already formed, the boundaries between the layers under the dielectric are shown by dashed lines, except where the stripe has exposed the layers. Note that the diagonal angle of the stripe 18 greatly increases the aspect ratio, or distance along the stripe between the low-resistivity layers 14 relative to the width of the stripe.

Figure 4:
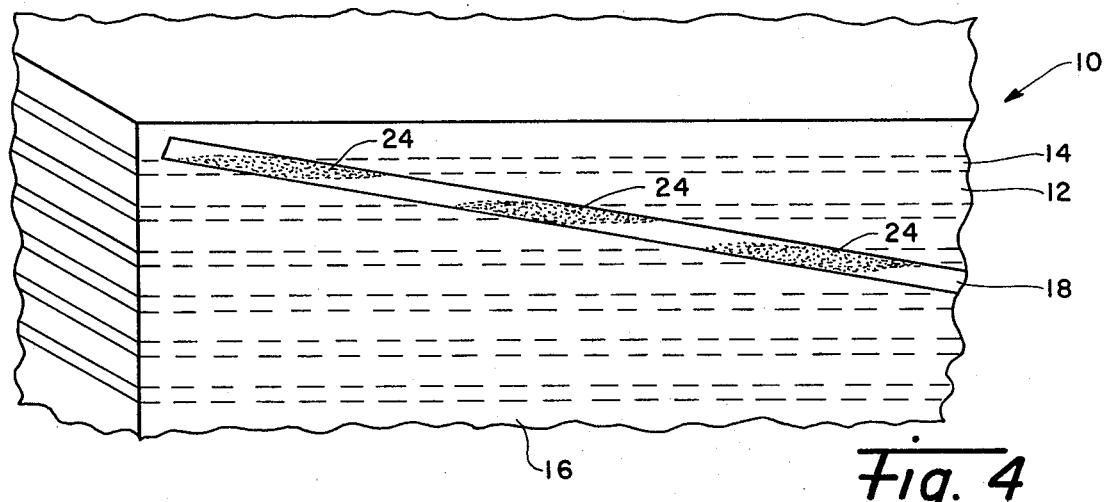
FIG. 4 is a view of the stack of FIG. 1 showing the metallic contact areas after the plating process.

As shown in FIG. 2, a metallic contact 22 is made by conventional means (such as vacuum evaporation or sputtering) to a surface area of the opposite edge 26 of the epitaxial stack 10. The contact 22 may be made on part of the edge 26, as shown, or on the entire surface thereof. This metallic layer 22 connects the low-resistivity layers together and serves as a common cathode electrode. After suitably masking the other edges of the stack (say with low melting wax), the edge 16 with the stripe opening is immersed in a metallic plating bath (FIG. 3) and sufficient electric potential is applied to the common metallic electrode 22 to cause current flow through each of the low-resistivity layers at the point where it is exposed to the plating solution through the strip opening in the dielectric layer. A deposit of metal 24 is thus formed at each such exposure of each low-resistivity layer. FIG. 4 shows the metal deposit thus formed.

After the electroplating operation has been completed and microscopic examination shows that each low-resistivity layer has been properly decorated, then the common metal electrode 22 is removed (by chemical or mechanical means, for example) and all edges except that one already chosen for the contacts can be covered with a dielectric layer to minimize surface leakage and to prevent possible spark breakdown between layers.

If the initial electroplated deposit is not suitable for direct use as an electrode, then it can be enlarged by further plating (either by electroplating or electroless techniques) to serve as a decoration to locate the contact zone for a latter evaporated contact. That is, it could be used to generate a unique mask for that set of low-resistivity layers. A self-aligned photographic mask of the electrode contact points can also be generated if necessary by autoradiographic techniques. In this method, the edge with the low-resistivity contacts is immersed in a solution containing a radioisotope of the electroplated metal. Sufficient ion exchange occurs, usually in a few minutes, to cause sufficient radioactivity at each metal bump that it can then expose a pattern on photographic film placed in direct contact with this stack edge. This photographic pattern thus represents a unique record of the actual location at which contact should be made to each low-resistivity lazer 14 in that stack 10. A third technique to generate a unique mask set would be to utilize scanning electron microscope techniques to provide a computer-stored image of the location of each electrodeposited metallic contact decoration.

Figure 5:
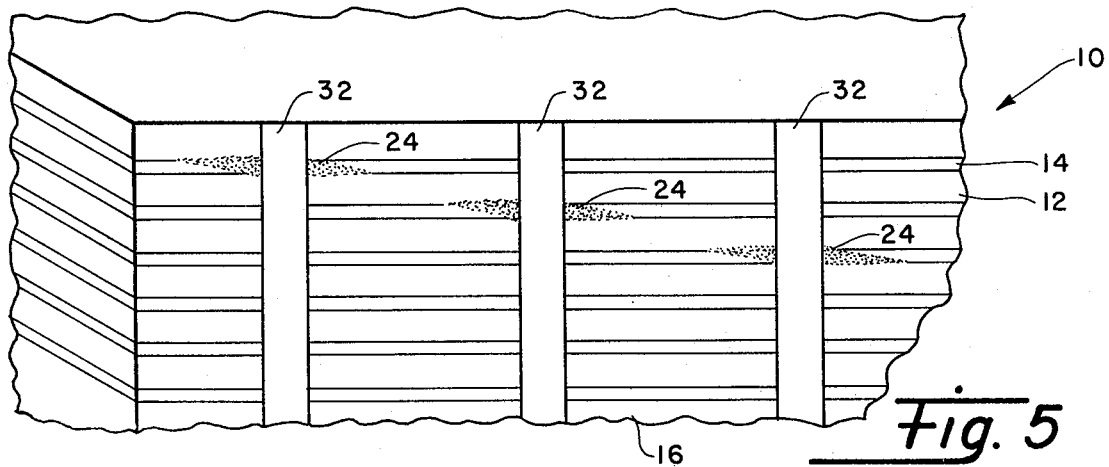
FIG. 5 is a view of the stack of FIGS. 1 and 4, showing electrode bars formed over the contact areas.

Each deposit 24 may be used directly as the contact for an evaporated or sputtered electrode stripe 32, as shown in FIG. 5. Several possible electrode configurations suggest themselves and examples are shown in FIGS. 6 and 7. These are not meant to exhaust the possibilities but just to serve as examples to a skilled engineer. FIG. 6 shows a single stack, and FIG. 7 shows a double stack with "fold over" electrode connections. The electrodes may have bonding pads 33 connected to the electrode stripe 32 as shown in FIGS. 6 and 7.

Thus, while preferred constructional features of the invention are embodied in the structure illustrated herein, it is to be understood that changes and variations may be made by those skilled in the art without departing from the spirit and scope of my invention.

I claim:

1. The method of forming contacts for separate electrical connections to low-resistivity layers of an epitaxially grown stack of alternate high and low-resistivity layers, said method comprising the steps of:

coating one edge of the stack with a dielectric;

forming a diagonal strip opening across the edge through the dielectric to thereby expose the edges of the layers;

forming on a different edge of the stack a metallic contact which makes electrical connections to all of the low-resistivity layers, to provide a common electrode;

immersing said one edge in a metallic plating solution and applying an electric potential between said common electrode and said solution, so that current flows through each of the low-resistivity layers, and at the point where it is exposed to the plating solution through said strip opening a deposit of metal is formed, to thereby provide a contact area for each low-resistivity layer for electrical connections; and removing said common electrode.

2. The method of claim 1, which preceeding said immersing step, includes masking the remaining edges of the stack, and also any area on said different edge not covered by said common electrode;

3. The method of claim 2, with the further step of covering all edges of the stack except said one edge with a dielectric layer to minimize surface leakage and to prevent possible spark breakdown between layers.

* * * * *